United States Patent [19]
Cohen et al.

[11] Patent Number: 5,821,510
[45] Date of Patent: Oct. 13, 1998

[54] LABELING AND TRACING SYSTEM FOR JUMPER USED IN AN EXCHANGE

[75] Inventors: Leonard George Cohen, Atlanta; George Frank DeVeau, Cumming, both of Ga.

[73] Assignee: Lucent Technologies Inc., Murray Hill, N.J.

[21] Appl. No.: 762,258

[22] Filed: Dec. 9, 1996

Related U.S. Application Data

[63] Continuation of Ser. No. 362,292, Dec. 22, 1994, abandoned.

[51] Int. Cl.$^6$ .............................. G06F 17/00; G09F 3/00
[52] U.S. Cl. .......................... 235/375; 235/385; 79/326; 439/489; 439/491
[58] Field of Search .................................... 235/375, 385; 379/25, 178, 326; 439/955, 488, 489, 491

[56] References Cited

U.S. PATENT DOCUMENTS

| | | | |
|---|---|---|---|
| 1,281,288 | 10/1918 | Carley | 439/491 |
| 1,373,416 | 4/1921 | Everett | 439/491 |
| 2,043,919 | 6/1936 | Bengtson | 439/491 |
| 4,878,610 | 11/1989 | Jove et al. | 360/67 |
| 4,934,785 | 6/1990 | Mathis et al. | 350/96.21 |
| 5,103,353 | 4/1992 | Jove et al. | 360/67 |
| 5,122,915 | 6/1992 | Klein et al. | 360/113 |
| 5,204,789 | 4/1993 | Jove et al. | 360/67 |
| 5,212,752 | 5/1993 | Stephenson et al. | 385/78 |
| 5,274,729 | 12/1993 | King et al. | 385/134 |
| 5,444,579 | 8/1995 | Klein et al. | 360/67 |
| 5,534,818 | 7/1996 | Peterson | 327/545 |
| 5,588,873 | 12/1996 | Hamai et al. | 439/491 |
| 5,635,868 | 6/1997 | Aiello et al. | 327/538 |

OTHER PUBLICATIONS

Advertizement Brochure "LDT 3805/LRT 3800", Portable Data Collection Computer with Laser Scanner/Portable RF Data Collection Computer with Laser Scanner, By Symbol Express, Symbol Express 1995 Catalog (1994).

Brochure on LXE Scanners by Welch Allyn, Data Collection Division, 4619 Jordan Road, Skaneateles Falls, NY 13153–0187 (published Jun., 1994).

*Primary Examiner*—Donald T. Hajec
*Assistant Examiner*—Drew A. Dunn

[57] ABSTRACT

The present invention includes a system for tracing jumpers used in an exchange to cross-connect optical fibers or wires served by the exchange. The system includes an exchange housing receptacles with optically-encoded data associated with each receptacle or a group of receptacles. The optically-encoded data for a receptacle(s) uniquely identifies the physical location of the receptacle from any other receptacle in the exchange. Likewise, the jumpers each have optically-encoded data formed thereon that uniquely identifies the jumper or jumper end and distinguishes the jumper from any other jumper used in the exchange. If no jumper is to be connected to a particular receptacle, a cover with optically-encoded data can be attached to a receptacle to indicate that no jumper is connected to the receptacle. The system of this invention also includes a handheld optical scanner that can be used by an operator to scan the optically-encoded data associated with a receptacle(s) and the optically-encoded data of a jumper(s) connected to the receptacle(s), and transmits the optically-encoded data signals to a computer of the system of this invention. The computer can generate a display of the physical location of a receptacle(s) in association with the identity of the jumper(s) and connected thereto, so that an operator can diagnose misconnections of the jumpers between receptacles in the exchange.

26 Claims, 6 Drawing Sheets

LABELING AND TRACING SYSTEM FOR JUMPER USED IN AN EXCHANGE

CROSS REFERENCE TO RELATED APPLICATION

This is a continuation of application Ser. No. 08/362,292, filed Dec. 22, 1994 now abandoned.

BACKGROUND OF THE INVENTION

1. Field of the Invention

This invention is directed to a tracing system for jumpers used in an exchange to cross-connect optical fibers or wires.

2. Description of the Related Art

Exchanges are widely used to cross-connect optical fibers or wires to establish signal transmission paths. Typically, an exchange houses a large array of receptacles or sockets receiving respective ends of the optical fibers or wires served by the exchange. To establish cross-connections, jumpers with an optical fiber or wire core and an outer protective covering are used. A signal transmission path is established by plugging the ends of an optical fiber or wire jumper into two receptacles so that a signal can travel from the optical fiber or wire mounted to one receptacle, to the optical fiber or wire mounted to the other receptacle via the jumper. Of course, a large number of cross-connections between receptacles are used in an exchange, so a correspondingly large number of jumpers must be used to establish these cross-connections.

The large number of jumpers used in an exchange renders administration of the cross-connections extremely difficult and tedious for an operator to perform. More specifically, if an operator is required to establish or change a cross-connection, or replace a faulty jumper, for example, the operator must identify a particular jumper from among numerous bundles of jumpers connected between receptacles in the exchange. Also, once a particular jumper has been located in the exchange, jumper characteristics such as length or type, the routing of the jumper through the exchange and/or the traffic carried on the jumper, may not be apparent from external examination of the jumper.

In an effort to provide a solution to some of the problems noted above, a computer system has been used to store a data record of the addresses of the physical locations of the receptacles served by an exchange. In association with each address, the address of the receptacle that should be connected to a given receptacle with a jumper is also stored, together with the jumper length and jumper routing through the exchange. However, this system is greatly susceptible to human error because rather large amounts of data are input and maintained by a human operator using a keyboard. More specifically, problems can readily occur if a human operator inputs an incorrect jumper identity for a receptacle or inputs the wrong jumper length or routing, for example. Also, this system is totally without the capability to verify whether jumper connections between receptacles have been properly made.

One system that has been used to verify whether correct jumper connections have been made in an exchange requires specially adapted jumpers having auxiliary plastic fiber extending along their lengths. The receptacles of the exchange also have auxiliary plastic fibers leading to control circuitry. When a jumper is plugged into a receptacle, its plastic fiber is optically connected to the receptacle's plastic fiber. Accordingly, when both ends of the specially adapted jumper are coupled to respective receptacles, an optical pulse can make a complete circuit running from the control circuitry through a receptacle's plastic fiber, through a jumper's plastic fiber and back to the control circuitry through another receptacle's plastic fiber. By optically pulsing a particular fiber and determining the receptacle fiber upon which the optical pulse is returned to the control circuitry, the control circuitry can determine the actual connection between receptacles so that an operator can verify whether cross-connections have been made correctly. Although meritorious to an extent, this system suffers from the drawback that the jumpers must be specially manufactured with auxiliary plastic fibers. Likewise, the receptacles, the receptacle housing and control circuitry must be specially manufactured using non-standard items, and the overall system is relatively complicated.

SUMMARY OF THE INVENTION

The present invention overcomes the problems and deficiencies noted above. The present invention includes a system with an exchange housing a plurality of receptacles. The receptacles receive respective optical fibers or wires at one end, and have respective sockets at the other ends thereof. Importantly, optically-encoded data is placed on the exchange in association with respective receptacles or groups of receptacles, to uniquely identify the physical location of the receptacles and distinguish the receptacles from other receptacles housed in the exchange. The optically-encoded data for the receptacles can also indicate the type of jumper and/or length of the jumper to be used with the receptacle, as well as the correct routing of the jumper through the exchange, the traffic to be carried thereon and/or the identity of the physical location of the receptacle to be connected to the other end of the jumper.

For example, the optically-encoded data such as a bar code(s) can be printed on a non-adhesive side of a sticker, and placed on the exchange in association with a receptacle or small group of receptacles using an adhesive side of the sticker. Also, for example, the optically-encoded data identifying the receptacle(s) can include a plurality of bar codes identifying the bay, frame, shelf and module in which a receptacle(s) is located in the exchange. The system of this invention also includes a plurality of jumpers for establishing respective cross-connections in the exchange by connecting the connectors at each end of the jumper into respective appropriate receptacles. Importantly, the jumpers have optically-encoded data uniquely identifying the jumper from any other jumper used in the exchange. The optically-encoded data for the jumpers can also indicate the type of jumper, the length of the jumper, the proper routing of the jumper through the exchange and/or the traffic to be carried on the jumper. The optically-encoded data can be provided in association with each end of a jumper to not only identify the jumper itself, but also the end of the jumper with which the optically-encoded data is associated. The jumper has connectors attached at each end and the connectors are each adapted to slide into and hold in position in a receptacle. The optically-encoded data can be formed on a flat, exposed integral surface of a connector or can be formed on a tag adapted to slidably fit on the connector attached to the end of a jumper. Further, the system of this invention includes covers that can be fitted to respective receptacles. Each cover has optically-encoded data indicating that no jumper is connected to the receptacle to which the cover is attached. The cover advantageously prevents dust and the like from entering the receptacle.

The system of this invention also includes a hand-held optical scanner for scanning the optically-encoded data placed in association with the receptacles in the exchange, as well as the optically-encoded data for a jumper. Based on this scanning, the optical scanner generates signals for transmission to a computer which is a part of the system of this invention. The signals can be transmitted from the optical scanner by radio transmission, or by wire lead coupled to the computer. If radio transmission is used, the system of this invention includes a receiver interface coupled to the computer, to receive the signals from the optical scanner and convert them into a form compatible with the computer. The computer includes a processor, a memory and a display unit and can include a manual data input (MDI) unit. Based on the signals received from the optical scanner, the computer is capable of generating a display of a physical location of a receptacle in the exchange in association with the jumper or jumper end connected to the receptacle. Further, in association with the identity of the physical location of a receptacle, the computer can generate a display including the type of jumper, the jumper length, the routing of the jumper to be used with the receptacle, the identity of the physical location of the receptacle to which the other end of the jumper is to be attached and/or the traffic to be carried by the receptacle, based on a signal generated by scanning the optically-encoded data associated with a receptacle, using the optical scanner. Also in association with the identity of a jumper actually connected to a receptacle, the computer can generate a display including the type of jumper, the jumper length, the routing of the jumper, the traffic to be carried by the jumper and the identities of the receptacles to which the jumper or respective jumper ends are to be connected based on a signal generated by scanning the optically-encoded data associated with a jumper, using the optical scanner. An operator can use this display to compare the information pertaining to the receptacle with the information pertaining to the jumper connected to the receptacle, to determine whether the correct jumper or jumper end has been connected to a particular receptacle, to determine whether the jumper is the appropriate type or length for a connection, and to determine whether the jumper has been routed correctly by comparing the actual routing of the jumper with that on the display. Alternatively, the computer can compare the information pertaining to the receptacle with the information pertaining to the jumper connected to the receptacle, and indicate any discrepancies on the display. Also, an operator can use the display to determine whether the receptacle and connected jumper are associated with traffic that is of interest to the operator as often an operator must establish or change cross-connections for a particular client. In addition, the computer can be used to perform verification of proper cross-connections by comparing the information obtained by scanning the optically-encoded data for a receptacle and/or its connected jumper, with verification data stored in the memory of the computer. The verification data can include the identities of the physical locations of the receptacles housed in the exchange in association with the identities of the jumper or jumper end that should be connected to each receptacle, if any, the jumper type, length, routing, the traffic to be carried by the jumper and/or the identity of the physical location of the receptacle to which the other end of the jumper that should be connected. This verification data can be input to the computer's memory from an external source, input by an operator using an MDI unit or, in accordance with this invention, input by scanning the optically-encoded data associated with the receptacles and connected jumpers in the exchange.

Accordingly, the system of this invention provides an operator with the capability to readily determine whether correct cross-connections have been made in the exchange, with relative simplicity and reduced expense compared to previous systems.

These together with other objectives and advantages of this invention which will become subsequently apparent, reside in the details of construction and operation as more fully hereinafter described and claimed, reference being had to the accompanying drawings, forming a part hereof, wherein like numerals refer to like parts throughout.

DESCRIPTION OF THE PREFERRED EMBODIMENTS

Figure 1A:
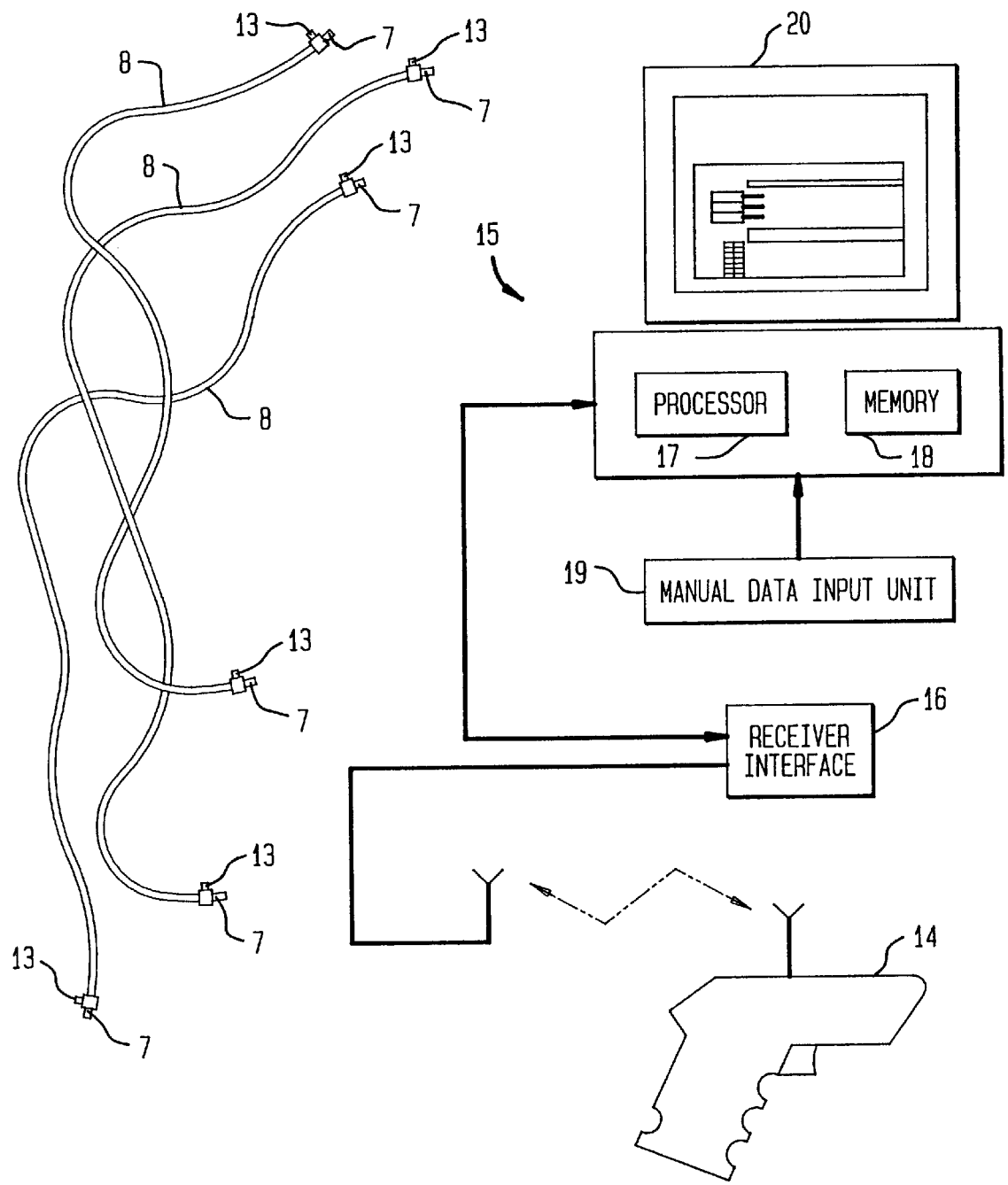
FIGS. 1A and 1B are diagrams showing a system in accordance with this invention.
Figure 1B:
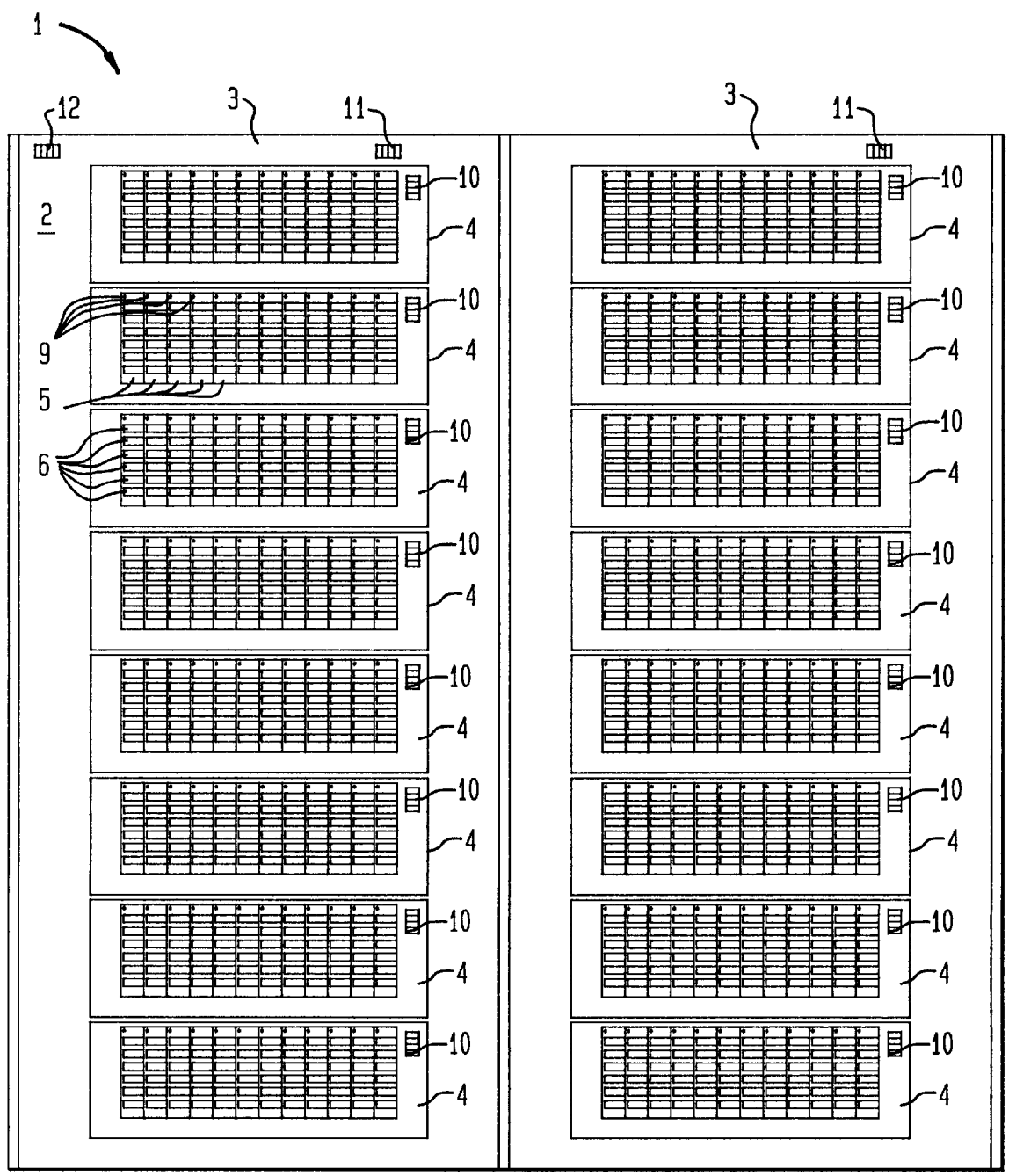

In FIGS. 1A and 1B, the system of this invention includes an exchange 1 with a bay 2. The bay 2 is subdivided into two frames 3, each housing eight shelves 4. Each shelf 4 includes twelve modules 5, only a few of which are specifically indicated in FIG. 1B to avoid unnecessary complication. Each module 5 includes a group of six receptacles 6. For simplicity, only six receptacles 6 are specifically indicated in FIG. 1B. The receptacles 6 receive respective optical fibers or wires at one end thereof. This end of the receptacle is not visible in FIG. 1B as it is on the back side of the bay 2 which is not shown FIG. 1B. At the ends on the front side of the bay 2 illustrated in FIG. 1B, the receptacles 6 are each adapted to receive a connector 7 attached to the end of a jumper 8, as shown in FIG. 1A. Therefore, by plugging the connector 7 at one end of the jumper 8 into an appropriate receptacle 6 and the connector 7 attached to the other end of the jumper 8 into another receptacle 6, a cross-connection can be established in the exchange 1. Although the jumpers 8 of FIG. 1A are not shown as connected to any receptacle 6 in FIG. 1B, it will be appreciated that in the typical exchange, large numbers of jumpers 8 would be so connected. Thus, the enormity of the problem of administering the jumpers 8 and the need for the present invention should be appreciated.

Although only one bay is illustrated in FIG. 1B for simplicity, the typical exchange has several bays to accommodate the large number (typically several tens of thousands) of cross-connections normally required in an exchange. Also, each bay in the typical exchange contains several frames, but for simplicity, only two frames 3 have been illustrated in FIG. 1B. Further, the number of shelves in a frame, the number of modules in a shelf and the number of receptacles in a module, can be different than the numbers of shelves 4, modules 5 and receptacles 6 shown in FIG. 1B without departing from the scope of this invention. In addition, the use of frames, shelves and modules can be dispensed with entirely by building bays with arrays of receptacles, and such configuration can also be used with the present invention.

Importantly, each group of six receptacles 6 in a module 5 have optically-encoded data 9 placed in association therewith. For simplicity, only four of the optically-encoded data 9 are specifically indicated in FIG. 1B. This optically-encoded data uniquely identifies the physical location of the group of receptacles 6 in a module 5 and distinguishes these receptacles 6 from other receptacles 6 housed in the exchange 1. The optically-encoded data 9 for the receptacle 6 can also indicate the type of jumper 8 and/or length of the jumper 8 to be used with the receptacle 6, as well as the correct routing of the jumper 8 through the exchange 1. The optically-encoded data 9 can as well indicate the traffic to be carried on the jumper 8 and/or the identity of the physical location of the receptacle 6 to be connected to the other end of the jumper 8. The optically-encoded data can be such as a bar code printed on a non-adhesive side of a paper or plastic sticker that is placed on the exchange 1 in association with a receptacle(s) 6 using an adhesive side of the sticker. The development of two-dimensional bar codes has enabled considerably dense encoding so that a relatively large amount of data can be represented by the optically-encoded data 9. However, if necessary, the encoding density can be reduced to an extent by identifying the physical location of a receptacle(s) 6 using not only the optically-encoded data 9, but also optically-encoded data 10 associated with each shelf 4 indicating the physical location of the shelf 4 in the exchange 1, optically-encoded data 11 associated with each frame 3 indicating the physical location of the frame 3 in the exchange 1, and optically-encoded data 12 associated with the bay 2 uniquely identifying the physical location of the bay 2 in the exchange 1. Preferably, dense optical-encoding is used so that only one optically-encoded data 9 is used for each receptacle 6 or small groups of receptacles 6 (i.e., the group of receptacles 6 contained in a module 5).

The jumpers 8 have optically-encoded data 13 associated therewith. This optically-encoded data 13 uniquely identifies and distinguishes the jumper 8 from any other jumper 8 used in the exchange 1. Preferably, the optically-encoded data 13 is of a different type than the optically-encoded data 9 (and optically-encoded data 10, 11, 12 if used). For example, Code 39 or PDF 417 coding can be used for the optically-encoded data 9 whereas channel coding can be used for the optically-encoded data 13. Although the jumper 8 can be such that it has only one set of optically-encoded data 13 formed thereon to uniquely identify the jumper 8, the jumper 8 preferably has optically-encoded data 13 associated with both ends of the jumper 8 to uniquely identify the jumper end from any other jumper end used in the exchange 1B. The jumper 8 has connectors 7 attached at each jumper end and the connectors 7 are each adapted to slide into and hold in position in a receptacle 6. The optically-encoded data 13 can be formed on a flat-exposed integral surface of a connector 7 or can be formed on a tag adapted to slidably fit on the connector 7 attached to the end of a jumper 8 (the specific embodiments of the optically-encoded data 13 will be explained in more detail with reference to FIGS. 2 and 3 later in this specification.) Importantly, the optically-encoded data for the jumpers 8 not only uniquely identifies the end of the jumper 8 from any other jumper 8 used in the exchange 1, but can also indicate the type of jumper 8, the length of the jumper 8, the proper routing of the jumper 8 through the exchange 1 and/or the traffic to be carried on the jumper 8.

The system of this invention also includes a hand-held optical scanner 14 that can be used to scan the optically-encoded data associated with a receptacle 6 or group of receptacles 6 (i.e., a module 5), as well as the optically-encoded data 10, 11, 12 associated with a shelf 4, a frame 3, and a bay 2, respectively. Of course, the optical scanner 14 can also be used to scan the optically-encoded data 13 associated with a jumper 8. The optical scanner 14 preferably uses radio transmission to transmit scanned optically-encoded data 9 and 13 (and optically-encoded data 10, 11, 12 if needed) to a computer 15 which is a part of the system of this invention. For example, the optical scanner 14 can be one of a number of commercially-available models such as the LDT3805/LRT3800 manufactured by Symbol Express, Inc. of Bohemia, N.Y., or various models such as the LXE scanner available from Welch Allyn, Skaneateles Falls, N.Y. By radio transmitting the optically-encoded data to a receiver interface 16 coupled to the computer 15, a user of the hand-held optical scanner 14 is provided with freedom of movement as no wire lead connects the optical scanner 14 to the computer 15. However, if a trailing wire lead would not be inconvenient for the user of the hand-held optical scanner 14 or the expense of a radio-transmitting optical scanner 14 is too great, a direct wire connection from the optical scanner 14 to the computer 15 can be used.

The receiver interface 16 receives with its antenna the optically-encoded data transmitted from the antenna of the optical scanner 14 and converts this optically-encoded data into a form compatible with the computer 15. Also, the radio interface 16 can be such as to distinguish whether optically-encoded data 9 (and 10, 11, 12 if used) or optically-encoded data 13 has been scanned based on the encoding scheme, and indicate to the computer 15 whether the scanned optically-encoded data pertains to a receptacle 6 or a group of receptacles 6, or pertains to a jumper 8. The receiver interface 16 is commercially available from companies that manufacture optical scanners or from other commercial sources such as personal computer and associated accessories manufacturers. The receiver interface 16 provides the converted optically-encoded data 9 (and 10, 11, 12 if used) and 13 to the computer 15. The computer 15 includes a processor 17, a memory 18, a manual data input (MDI) unit 19 and a display 20. The processor 17 controls the storing of the optically-encoded data received from the optical scanner 14 in the memory 18. The processor 17 in conjunction with the memory 18 can be used to generate a display on the display unit 20, based on the optically-encoded data signals from the optical scanner 14. More specifically, the user can scan the optically-encoded data 9 for a particular receptacle 6 or a group of receptacles 6 (i.e., a module 5), and scan the optically-encoded data 13 associated with the jumper(s) 8 connected to this receptacle(s) 6. The processor 17 can be programmed to store the optically-encoded data signals from the optical scanner 14 in the memory 18 and/or to generate a display on the display unit 20. This display can include the identity of the physical location of the receptacle 6 in association with the identity of the jumper 8 or the end of the jumper 8 connected to the receptacle 6. Further, in association with the identity of the physical location of the receptacle 6, the computer 15 can generate a display including the type of jumper 8, the jumper length, the routing of the jumper 8 to be used with the receptacle 6, the identity of the physical location of the receptacle 6 to which the other end of the jumper 8 is to be attached and/or the traffic to be carried by the receptacle 6, based on the signal generated by scanning the optically-encoded data 13 associated with the receptacle 6, by using the optical scanner 14. Also, in association with the identity of the jumper 8 or the end of the jumper 8 actually connected to the receptacle 6, the computer 15 can generate a display including the type of jumper 8, the jumper length, the routing of the jumper 8, the traffic to be carried by the jumper 8 and the identities of the receptacle(s) 6 to which the jumper(s) 8 or respective jumper end(s) are to be connected, based on a signal generated by scanning the optically-coded data associated with the jumper 8, with the optical scanner 14. The user or operator can use this display to compare the information pertaining to the receptacle 6 with the information pertaining to the jumper 8 to determine whether the correct jumper 8 or jumper end has been connected to the receptacle 6, to determine whether the jumper 8 is the appropriate type or length for a cross-connection, and to determine whether the jumper 8 has been routed correctly by comparing the actual routing of the jumper 8 with that on the display. Alternatively, the computer 15 can be programmed to compare the information pertaining to the receptacle 6 or group of receptacles 6, with the information pertaining to the connected jumper(s) 8, to determine and indicate any discrepancies on the display. Also the operator or user can use the display to determine whether the receptacle 6 and connected jumper 8 are associated with traffic that is of interest to the operator as often an operator must establish or change cross-connections for a particular client. In addition, the computer 15 can be used to perform verification of proper cross-connections by comparing the information obtained by scanning the optically-encoded data for the receptacle 6 and its connected jumper 8, with verification data stored in the memory 18 of the computer 15. The verification data can include the identities of the physical locations of the receptacles 6 housed in the exchange 1 in association with the identities of the jumper 8 or jumper end to be connected to each receptacle 6 (if any), the jumper type, length, routing, the traffic to be carried by the jumper 8 and/or the identity of the physical location of the receptacle 6 to which the other end of the jumper 8 is to be connected. If comparison of the optically-encoded data signals from either the receptacle(s) 6 or the jumper(s) 8 connected to the receptacle(s) 6 do not match the corresponding verification data stored in the memory 18, the processor 17 can cause the display unit 20 to flag or blink any of the jumper or receptacle data that does not match the verification data. Accordingly, the display can be readily used by an operator to determine any problems or potential problems in cross-connections that may exist in the exchange 1. The verification data can be input to the memory 18 of the computer 15 from an external source, input by an operator using the MDI unit 19, or in accordance with this invention, input by scanning the optically-encoded data associated with the receptacles 6 and connected jumpers 8 in the exchange 1. More specifically, once cross-connections have been made using the jumpers 8 in the exchange 1, the user can scan the optically-encoded data 9 associated with the receptacle(s) 6 and scan the optically-encoded data 13 of the jumpers 8 connected to the receptacle(s) 6 sequentially for every receptacle 6 or group of receptacles 6 and connected jumper 8 in the exchange 1. The optically-encoded data signals generated by this procedure can be transmitted from the optical scanner 14 to the computer 15 by the receiver interface 16, and stored in the memory 18 as verification data.

Figure 2:
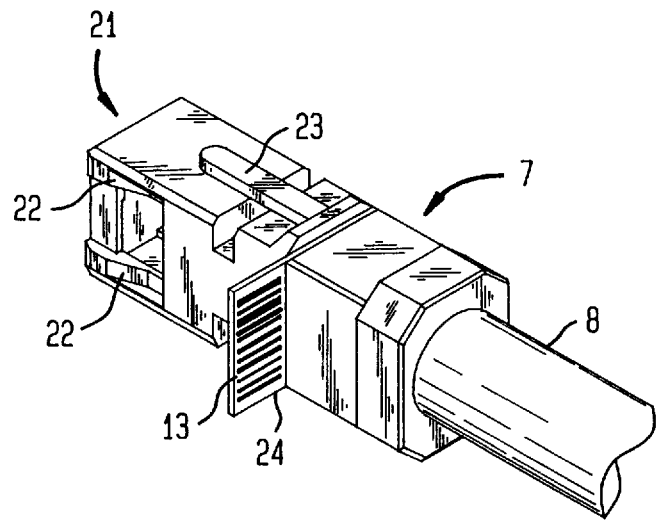
FIG. 2 is a perspective view of a jumper connector with optically-encoded data thereon.

FIG. 2 is a perspective view of a connector 7 attached to a jumper 8. The connector 7 in FIG. 2 is a standard connector (SC) type (see, e.g. U. S. Pat. No. to 5,212,752 to Stephenson, et al.) but other types of connectors (such as those disclosed in U.S. Pat. Nos. 4,934,785 to Mathis, et al.) can be used without departing from the scope of this invention. The SC connector 7 has an end 21 constructed to fit in a receptacle 6 which is widely available and can be, for example, such as those disclosed in U.S. Pat. No. 5,274,729 issued to King et al. In FIG. 2, the connector 7 is held in position in the receptacle 6 by locking surfaces 22 that receive respective hooked members in the receptacle 6 (not shown in FIG. 2), and a ridge 23 that slides into a groove in the receptacle 6 (not shown in FIG. 2). Importantly, the connector 7 has an exposed, radially extending flat surface 24 upon which the optically-encoded data 13 can be formed by printing with an optically-encoded data printer which can be one of a number of commercially available types such as the bar code printers sold by ZEBRA Technologies, Vernon Hills, Ill., under the trademark ZEBRA® 140 printer. In FIG. 2, the exposed flat surface 24 is a plastic flange integrally formed with the connector 7 that protrudes outwardly from the side of the connector 7 so that it is exposed and can be scanned using the optical scanner 14.

Figure 3:
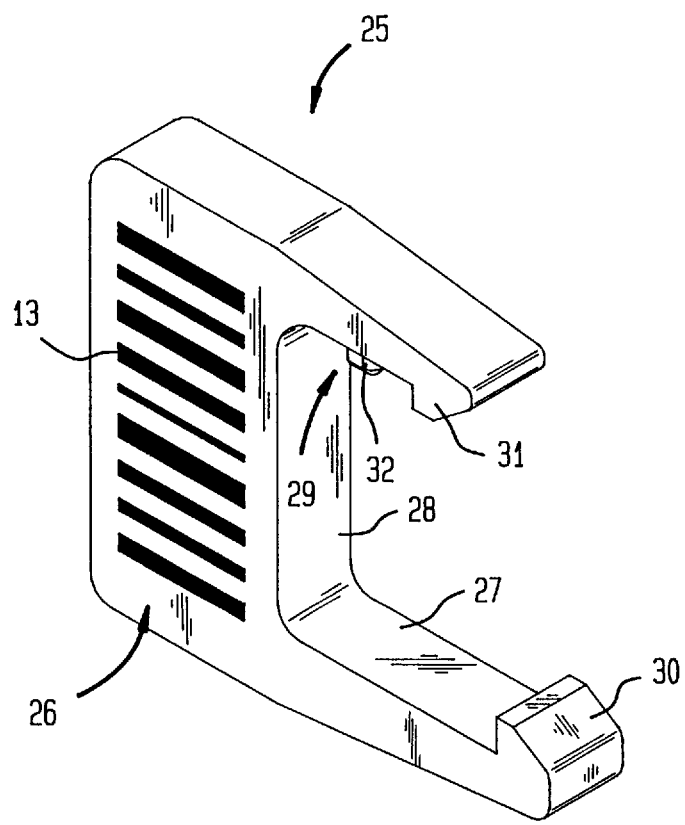
FIG. 3 is a perspective view of a tag with optically-encoded data that is adapted to slidably fit on a jumper connector.

FIG. 3 is a perspective view of a tag 25 that can be coupled to an SC connector 7 as shown in FIG. 2. The tag 25 can be formed from a material such as plastic and includes a flat exposed surface 26 with optically-encoded data 13 formed thereon by printing, for example. The tag 25 has three perpendicular edge surfaces 27, 28, 29 which are sized to fit on the end of the SC connector 7 of FIG. 2. To hold the tag 25 in place on the SC connector 7, the tag 25 includes hooked members 30, 31 which engage with a side of the connector 7. So that the tag 25 will not tend to toggle on the connector 7, a protrusion 32 is formed on the edge surface 29 in proximity to the hooked member 31. The hooked member 31 and the protrusion 32 receive therebetween the ridge 23 of the connector 7 (see FIG. 2) to firmly hold the tag 25 in position on the connector 7. Of course, it will be appreciated that other embodiments than those of FIGS. 2 and 3 can be used to form the optically-encoded data 13 in association with a jumper 8 or jumper end without departing from the scope of this invention.

Figure 4:
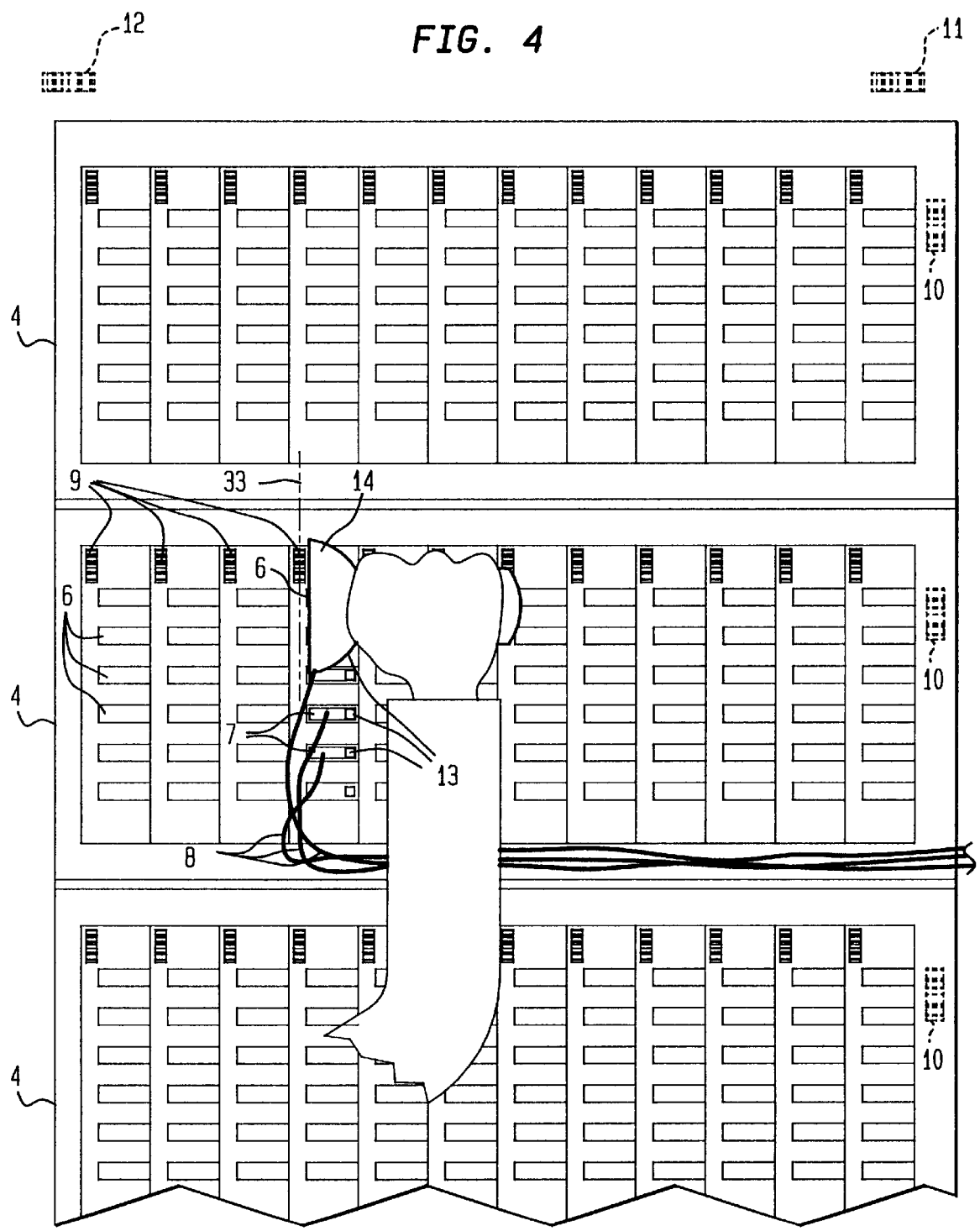
FIG. 4 is a diagram showing a scanning operation to read optically-encoded data associated with a module containing a group of receptacles.

FIG. 4 is a diagram illustrating a scanning operation performed for a group of six receptacles 6 (i.e., a module 5). The user manipulates the optical scanner 14 so that the scan beam 33 emitted by the optical scanner 14 reads the optically-encoded data 9 associated with the module 5. In FIG. 4, the fourth module 5 from the right-hand side in the second shelf 4 of the first frame 3, is scanned. As previously explained, the optically-encoded data 10, 11, 12 can be used in conjunction with the optically-encoded data 9 to identify the physical location of the module 5 if the optically-encoded data 9 is not of a coding type that can sufficiently densely encode the information desired to be provided therein.

Figure 5:
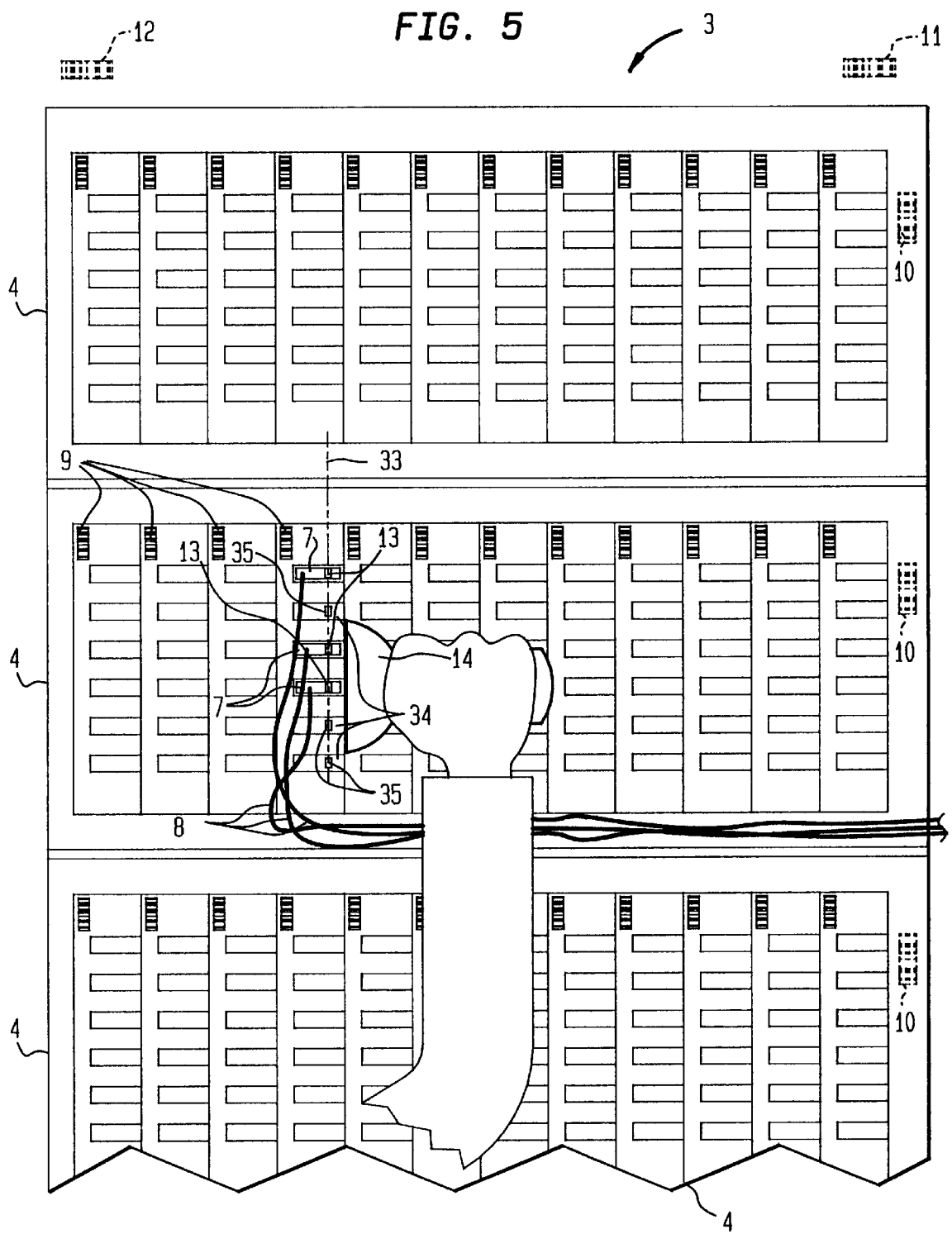
FIG. 5 is a diagram showing a scanning operation for scanning the optically-encoded data on jumper connectors and covers.

FIG. 5 is a diagram illustrating the scanning operation for scanning the receptacles 6 associated with a module 5. The user manipulates the optical scanner 14 so that the scan beam 33 reads the optically-encoded data 13 associated with each jumper end connected in the module 5 that was scanned in FIG. 4. In the particular module 5 scanned in FIG. 5, three of the receptacles have no jumper 8 connected thereto. Accordingly, in accordance with this invention, covers 34 are fitted into these receptacles 6. Each cover 34 can be a flat plastic plate on an exposed side of the cover 34 with a connector formed on the backside to engage with the receptacle 6. The cover 34 prevents dust and the like from entering the receptacle 6 to which the cover 34 is attached. The covers 34 are provided with optically-encoded data 35 that indicates that no connector 7 is coupled to that particular receptacle 6. The optical scanner 14 reads the optically-encoded data 13 and 35 sequentially from the top to the bottom of the module 5. Accordingly, the optically-encoded data signal generated by the optical scanner 14 includes a sequence of data with the optically-encoded data 13 for the first jumper end connected to the first receptacle 6, the optically-encoded data 35 indicating that no jumper 8 is connected to the second receptacle 6, the optically-encoded data 13 of the jumper end connected to the third receptacle 6, the optically-encoded data 13 for the jumper end connected to the fourth receptacle 6, and optically-encoded data 35 indicating that no jumper 8 is connected to the fifth and sixth receptacles 6 in the module 5 scanned in FIG. 5.

Figure 6:
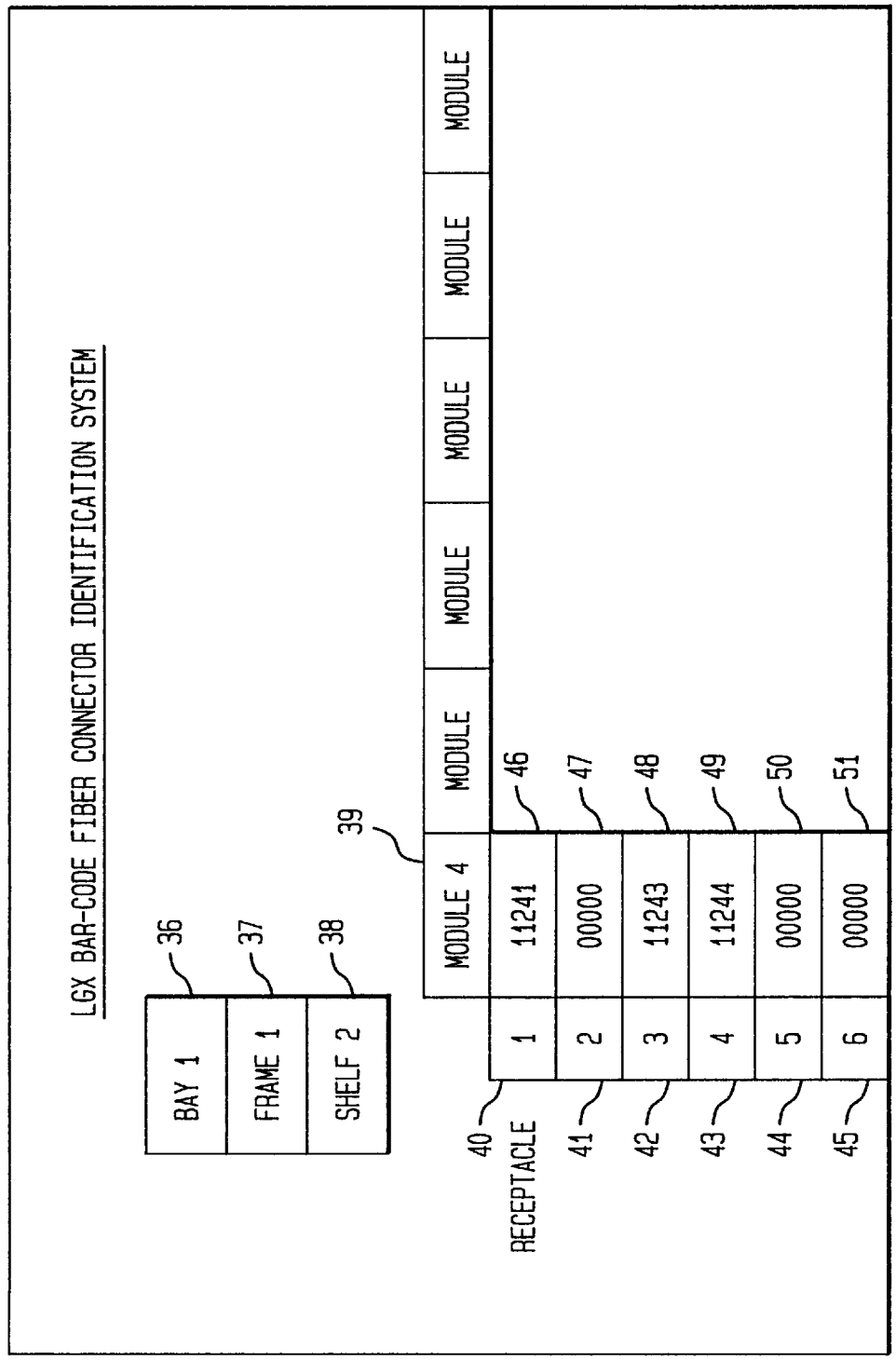
FIG. 6 is a view of a display that can be generated by the computer, based on the scanning operations of FIGS. 4 and 5.

FIG. 6 is a diagram of a display which can be generated by the computer 15 on its display unit 20 as a result of the scanning operations of FIGS. 4 and 5. The optically-encoded data signal from the optically-encoded data 9 associated with a receptacle(s) 6 uniquely identifies the physical location of the receptacle(s) 6 in the exchange 1. More specifically, the display includes the bay number (Bay 1) in field 36, the frame number (Frame 1) in field 37, the shelf number (Shelf 2) in field 38, and module number (Module 4) in field 39 and the receptacles numbers 1–6 in fields 40–45. As a result of the scanning operation performed in FIG. 5, the computer 15 generates the identity of the jumper end or cover 34 connected to each of the receptacles 1–6. Thus, in association with the physical locations of the receptacles 6 numbered 1, 3, and 4, the jumper end identities "11241" "1243," and "11244", respectively, are displayed in fields 46, 48, 49 by the display unit 20. In association with the identities of the physical locations of the receptacles 6 numbered 2, 5 and 6, a "00000" occurs in fields 47, 50, 51 in the display to indicate that no jumper 8 is connected to these receptacles 6. As previously noted, the computer 15 can compare the optically-encoded data 9, 10, 11, 12, 13 and 35 with verification data stored in the memory 18, to determine if any discrepancies exist. Any discrepancies can be indicated by flagging or flashing a field for which there is a discrepancy, for example. In FIG. 6, the receptacle identities match the jumper end identities, so no discrepancies exist. Accordingly, the operator is assured that appropriate connections of receptacles 6 and connected jumpers 5 have been made.

Although the display of FIG. 6 only indicates the identity of the physical location of receptacles 6 in association with the jumpers ends connected thereto, other data can be displayed by the display unit 20 as previously noted This information for the optically-encoded data 9 as well as the optically-encoded data 10, 11, 12 (if used) can include the type of jumper 8 and/or the length of the jumper 8 to be used with the receptacle 6, the correct routing of the jumper 8 through the exchange 1, the traffic to be carried on the jumper 8, and/or the identity of the physical location of the receptacle 6 to be connected to the other end of the jumper 8. Further, in association with the identity of the jumper 8 or jumper end, the optically-encoded data 13 can indicate the type of jumper 8, the length of the jumper 8, and the proper routing of the jumper 8 through the exchange 1 the traffic to be carried on the jumper 8 and/or the identity of the physical location of the receptacle 6 to be connected to the other end of the jumper 8. The information pertaining to a particular receptacle 6 can be compared with the information associated with the jumper 8 or jumper end connected to that receptacle 6, so that an operator can find any discrepancies which might indicate the existence of a problem or potential problem in the cross-connections in the exchange 1. Further, the computer 15 can be provided with verification data for comparison with any of the data obtained from the optically-encoded data 9–12 associated with a receptacle(s) 6 and/or with the optically-encoded data 13 for a jumper 8 or jumper end connected to a receptacle 6, to further provide an operator with the ability to diagnose any problems with cross-connections in the exchange 1. Although the invention has been described with specific illustrations and embodiments, it will be clear to those of ordinary skill in the art that various modifications may be made therein without departing from the spirit and scope of the invention as outlined in the following claims. For example, although the optically-encoded data 13 in FIGS. 5 and 6 pertain to a jumper end, this optically-encoded data 13 could be such that it pertains to the jumper 8 as a whole, and not specifically the jumper end. Further, although in FIG. 6 the connections are verified as correct if the optically-encoded data 9 and 35 matches the optically-encoded data 9, the optically-encoded data 13 can have different values than the optically-encoded data 9 associated with a receptacle 6 or receptacle group. In this case, the verification data stored in the computer 15 can relate the data pertaining to a given receptacle 6 or receptacle group with the jumper(s) 8 with the jumper ends to be connected thereto so that the cross-connections can be determined as correct or incorrect. All such modifications and variations are to be considered as included in the claimed invention.

We claim:

1. For use in an exchange having a plurality of receptacles the exchange having first optically-encoded data placed thereon for identifying physical locations of the receptacles in the exchange, the first optically-encoded data being independent of any connector to be received in the receptacles, an apparatus comprising:

a jumper for establishing a cross-connection having a first end and a second end, each end having a radially extending surface that is substantially perpendicular to a central axis of the jumper and on which second and third optically-encoded data are formed, the second optically-encoded data uniquely identifying one of the jumper ends and the third optically-encoded data uniquely identifying the other jumper end, said first, second and third optically-encoded data representing, in combination, an address of the physical location of a receptacle in association with the identity of the jumper if any connection is made to the receptacle.

2. An apparatus as claimed in claim 1, wherein the radially extending surfaces are an integral part of connectors attached to the jumper ends.

3. An apparatus as claimed in claim 1, wherein the radially extending surfaces are part of tags coupled to connectors attached to the jumper ends.

4. An apparatus as claimed in claim 1, wherein the second and third optically-encoded data include a bar code.

5. An apparatus as claimed in claim 1, wherein the second and third optically-encoded data include at least one of jumper type, jumper length, jumper routing through the exchange and traffic to be carried on the jumper.

6. A system comprising:

a plurality of jumpers, each jumper having a first end and a second end, each end having a radially extending surface that is perpendicular to a central axis of the jumper and on which first and second optically-encoded data are respectively formed, the first optically-encoded data uniquely identifying the first end of an associated jumper and the second optically-encoded data uniquely identifying the second end;

an exchange having receptacles each adapted to receive one said jumper end, said exchange having third optically-encoded data placed thereon for identifying physical locations of said receptacles in said exchange, said third optically-encoded data being independent of any said jumper to be received in said receptacles;

a scanner for scanning the first, second and third optically-encoded data, and generating first, second and third signals based on the first, second and third optically-encoded data, respectively; and a computer adapted to receive the first, second and third signals, and generating a display including at least an address of the physical location of a receptacle in association with an identity of a jumper, if any, connected to the receptacle, based on the first, second and third signals.

7. A system as claimed in claim 6, wherein the computer includes a memory storing the addresses of the physical locations of receptacles in the exchange, in association with respective identities of the jumpers, if any, connected to the receptacles.

8. A system as claimed in claim 7, wherein the computer includes a processor receiving the first, second and third signals, reading from the memory a particular address of a physical location of a receptacle and the associated identify of the jumper, if any, connected to the receptacle based on one of the first and second signals, performing a comparison between the associated identity of the jumper for the particular address and one of the first and second signals, generating a result for the comparison indicative of whether the associated identify of the jumper for the particular address is the same as the identity obtained from one of the first and second signals, and generating the display to indicate the result of the comparison.

9. A system as claimed in claim 6, further comprising:
a receiver interface coupled to the computer, for receiving the first, second and third signals radio-transmitted from the scanner.

10. A system as claimed in claim 6, further comprising:
a wire lead coupled between the scanner and the computer, for carrying the first, second and third signals from the scanner to the computer.

11. A system as claimed in claim 6, wherein the exchange includes a plurality of modules, each including six receptacles, and wherein the third optically-encoded data is associated with each module.

12. A system as claimed in claim 11, wherein the third optically-encoded data includes a bar code associated with each module.

13. A system as claimed in claim 11, wherein the exchange includes a plurality of shelves, each having a plurality of modules, and wherein the third optically-encoded data is associated with each shelf.

14. A system as claimed in claim 13, wherein the third optically-encoded data includes a bar code associated with each shelf.

15. A system as claimed in claim 13, wherein the exchange includes a plurality of frames, each including a plurality of shelves, and wherein the third optically-encoded data is associated with each frame.

16. A system as claimed in claim 15, wherein the third optically-encoded data includes a bar code associated with each frame.

17. A system as claimed in claim 15, wherein the exchange includes a plurality of bays, each including a plurality of frames, and wherein the third optically-encoded data is associated with each bay.

18. A system as claimed in claim 17, wherein the third optically-encoded data includes a bar code associated with each bay.

19. A system as claimed in claim 6, wherein the first and second optically-encoded data include at least one of jumper type, jumper length, jumper routing through the exchange and traffic to be carried on the jumper.

20. A system as claimed in claim 6, wherein the third optically-encoded data includes at least one of jumper type, jumper length, jumper routing through the exchange and traffic to be carried on the jumper.

21. A system as claimed in claim 6, further comprising:
a cover fitted in a receptacle and having fourth optically-encoded data indicating that no jumper is connected to the receptacle to which the cover is attached.

22. A method for establishing a cross-connection in an exchange having a plurality of receptacles, comprising the step of:
a) placing first optically-encoded data on the exchange for identifying physical locations of the receptacles in the exchange, said first optically-encoded data being independent of any connector to be received in the receptacles;
b) placing second and third optically-encoded data on a pair of radially extending surfaces that are substantially perpendicular to a central axis of an associated jumper and positioned at opposing ends thereof, the jumper being used to establish the cross-connection in the exchange, the second optically-encoded data uniquely identifying one of the jumper ends and the third optically-encoded data uniquely identifying the other jumper end, said first, second and third optically-encoded data representing, in combination, an address of the physical location of a receptacle in association with the identity of the jumper if any connection is made to the receptacle.

23. A method as claimed in claim 21, further comprising the step of:
c) connecting one of the jumper ends to a first receptacle and the other jumper end to a second receptacle to establish a cross-connection.

24. A method as claimed in claim 23, further comprising the steps of:
d) scanning one of the second and third optically-encoded data to generate a first signal;
e) scanning the first optically-encoded data associated with the first receptacle to generate a second signal; and
f) generating a display of an identity of the physical location of the first receptacle in the exchange, in association with the identity of the jumper end connected to the first receptacle, based on the first and second signals.

25. A method as claimed in claim 23, further comprising the steps of:
d) scanning one of the second and third optically-encoded data to generate a first signal;
e) scanning the first optically-encoded data to generate a second signal; and
f) storing in a memory an identity of the first receptacle in association with the identity of the jumper end connected to the first receptacle, based on the first and second signals.

26. A method as claimed in claim 23, further comprising the steps of:
d) scanning one of the second and third optically-encoded data to generate a first signal;
e) scanning the first optically-encoded data to generate a second signal;
f) reading stored data indicative of the jumper end that should be connected to the first receptacle, based on the second signal;
g) comparing the stored data with the first signal to generate a result indicative of whether one of the jumper ends is connected to the correct receptacle; and
h) generating a display based on the result.

* * * * *

UNITED STATES PATENT AND TRADEMARK OFFICE
CERTIFICATE OF CORRRECTION

PATENT NO. : 5,821,510                                   Page 1 of 2
DATED       : October 13, 1998
INVENTOR(S) : Cohen et al.

It is certified that error appears in the above-identified patent and that said Letters Patent is hereby corrected as shown below:

On the title page, in item [56] References Cited, U.S. Patent Document, insert the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 5 | 1 | 9 | 8 | 9 | 8 | 3 | 03/30/93 | Blake | | | |
| | | | | | | | | | | | | | |

UNITED STATES PATENT AND TRADEMARK OFFICE
CERTIFICATE OF CORRRECTION

PATENT NO. : 5,821,510
DATED : October 13, 1998
INVENTOR(S) : Cohen et al.

It is certified that error appears in the above-identified patent and that said Letters Patent is hereby corrected as shown below:

On the title page, in item [56] References Cited, U.S. Patent Document, insert the following:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | JP | 01 | 22 | 7 | 0 | 77 | A | 09/11/89 | Japan-Abstract Only | | | | |
| | JP | 07 | 09 | 42 | 4 | 2 | A | 04/07/95 | Japan-Abstract Only | | | | |
| | DE | 42 | 18 | 9 | 8 | 5 | A | 12/17/92 | Germany | | | | |
| | EP | 05 | 52 | 9 | 9 | 7 | A | 07/28/93 | Europe | | | | |
| | | | | | | | | | | | | | |

Signed and Sealed this

Sixth Day of April, 1999

Attest:

Attesting Officer

Q. TODD DICKINSON

Acting Commissioner of Patents and Trademarks